US006931050B1

(12) United States Patent
Bottomley

(10) Patent No.: US 6,931,050 B1
(45) Date of Patent: Aug. 16, 2005

(54) DIGITAL RECEIVERS AND RECEIVING METHODS THAT SCALE FOR RELATIVE STRENGTHS OF TRAFFIC AND PILOT CHANNELS DURING SOFT HANDOFF

(75) Inventor: Gregory E. Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/204,734

(22) Filed: Dec. 3, 1998

(51) Int. Cl.[7] .............................................. H04B 1/69
(52) U.S. Cl. ....................... 375/130; 375/148; 375/349
(58) Field of Search .............................. 375/130, 140, 375/141, 147, 148, 260, 347, 349; 370/335, 370/342

(56) References Cited

U.S. PATENT DOCUMENTS

| | | | |
|---|---|---|---|
| 5,101,501 A | 3/1992 | Gilhousen et al. | 455/33 |
| 5,109,390 A | 4/1992 | Gilhousen et al. | 375/1 |
| 5,237,586 A | 8/1993 | Bottomley | 375/1 |
| 5,305,349 A | 4/1994 | Dent | 375/1 |
| 5,673,291 A | 9/1997 | Dent | 375/262 |
| 5,737,327 A * | 4/1998 | Ling et al. | 370/335 |
| 5,778,030 A * | 7/1998 | Bruckert et al. | 375/317 |
| 5,809,020 A * | 9/1998 | Bruckert et al. | 370/335 |
| 5,812,542 A * | 9/1998 | Bruckert et al. | 370/335 |
| 6,009,089 A * | 12/1999 | Huang et al. | 370/342 |

FOREIGN PATENT DOCUMENTS

| | | |
|---|---|---|
| WO | WO 98/42155 | 9/1998 |

OTHER PUBLICATIONS

Sourour et al., "Method and Apparatus for Multipath Delay Estimation in Direct Sequence Spread Spectrum Communication System", U.S. Appl. No. 09/005,580, filed Jan. 12, 1998.

Karlsson et al., "Mobile Station having Plural Antenna Elements and Interference Suppression", U.S. Appl. No. 08/992,174, filed Dec. 17, 1997.

Bottomley et al, "Despreading of Direct Sequence Spread Spectrum Communications Signals", U.S. Appl. No. 08/748,755, filed Nov. 14, 1996.

International Search Report, PCT/US99/23969, Feb. 18, 2000.

* cited by examiner

*Primary Examiner*—Chieh M. Fan
(74) *Attorney, Agent, or Firm*—Myers Bigel Sibley & Sajovec

(57) ABSTRACT

Digital receivers and receiving methods scale for relative strengths of traffic and pilot channels during soft handoff. In particular, spread spectrum signals are processed from traffic channels and pilot channels by receiving data samples from traffic channels and pilot channels. Detection statistics are obtained from the received data samples that correspond to information symbols while accounting for the relative strengths of the traffic channels and the pilot channels. The detection statistics are preferably obtained by performing Rake combining while accounting for the relative strengths of the traffic channels and the pilot channels.

8 Claims, 6 Drawing Sheets

DIGITAL RECEIVERS AND RECEIVING METHODS THAT SCALE FOR RELATIVE STRENGTHS OF TRAFFIC AND PILOT CHANNELS DURING SOFT HANDOFF

FIELD OF THE INVENTION

This invention relates to digital communication systems and methods, and more specifically to reception of coded digital bit streams.

BACKGROUND OF THE INVENTION

Digital bit streams are transmitted and received in many digital communications systems including but not limited to data storage systems and wireless and wired data communications systems. For wireless communications, there is currently an evolution from analog communications to digital communications. Speech is represented by a series of bits that are modulated and transmitted from a base station to a radiotelephone. The radiotelephone demodulates the received waveform to recover the bits, which are then converted back into speech. There is also a growing demand for data services, such as e-mail and Internet access, which generally use digital communications.

There are many types of digital communications systems. Traditionally, Frequency-Division-Multiple-Access (FDMA) is used to divide the spectrum into a plurality of radio channels corresponding to different carrier frequencies. These carrier frequencies may be further divided into time slots, referred to as Time-Division-Multiple-Access (TDMA), as is the case in the D-AMPS, PDC, and GSM digital cellular radiotelephone systems. Alternatively, multiple users can use the same radio channel using spread spectrum techniques such as Code-Division-Multiple-Access (CDMA).

Direct-Sequence (DS) spread-spectrum modulation is commonly used in CDMA systems, in which each information symbol is represented by a number of "chips." Representing one symbol by many chips gives rise to "spreading", as the latter typically uses more bandwidth to transmit. The sequence of chips is referred to as a spreading code or signature sequence. At the receiver, the received signal is despread using a despreading code, which is typically the conjugate of the spreading code. IS-95 and J-STD-008 are examples of DS CDMA standards.

With DS CDMA systems, coherent Rake reception is commonly used. The received signal is despread by correlating to the chip sequence, and the despread value is weighted by the conjugate of a channel coefficient estimate, removing the phase rotation of the channel and weighting the amplitude to indicate a soft or confidence value. When multipath propagation is present, the amplitude can vary dramatically. Multipath propagation can also lead to time dispersion, which can cause multiple, resolvable echoes of the signal to be received. Correlators are aligned with the different echoes. Once the despread values have been weighted, they are summed. This weighting and summing operation is commonly referred to as Rake combining. Rake combining is described, for example, in U.S. Pat. No. 5,237,586 to the present inventor entitled "Rake Receiver with Selective Ray Combining" and U.S. Pat. No. 5,305,349 to Dent entitled "Quantized Coherent Rake Receiver", the disclosures of both of which are hereby incorporated herein by reference in their entirety.

A conventional digital communications system 100 is shown in FIG. 1. Digital symbols are provided to a transmitter 101, which maps the symbols into a representation appropriate for the transmission medium or channel such as a radio channel 103, and couples the signal to the transmission medium via a transmit antenna 102. The transmitted signal passes through the medium 103 and is received at a receive antenna 104. The received signal is passed to receiver 105. The receiver 105 includes a pre processor such as a radio processor 106, a baseband signal processor 110, and a post processor 112.

The radio processor 106 tunes to the desired band and desired carrier frequency, then amplifies, mixes, and filters the signal down to baseband. The signal is sampled and quantized, ultimately providing a sequence of baseband received samples. Since the original radio signal has in-phase (I) and quadrature (Q) components, the baseband samples may also have I and Q components, giving rise to complex baseband samples.

The baseband processor 110 is used to detect the digital symbols that were transmitted. It may produce soft information as well, which gives information regarding the likelihood of the detected symbol values.

The post processor 112 performs functions that may depend highly on the particular communications application. For example, it may use the soft detected values to perform forward error correction decoding or error detection decoding. It also may convert digital symbols into speech using a speech decoder.

Coherent detection generally uses an estimation of how the symbols were modified by the transmitter 101, the channel 103, and/or the radio processor 106. As discussed previously, the transmission medium may introduce phase and amplitude changes in the signal, for example as a result of multipath propagation. The signal may also have become dispersed, giving rise to signal echoes. Each echo may have an associated phase and amplitude, represented by a complex channel coefficient. Each echo also may have an associated delay. Coherent demodulation generally uses an estimation of these delays and coefficients. Typically, the channel is modeled as discrete rays, with channel coefficients assigned to the different delays.

In the IS-95 system, the forward link or down link (base station to radiotelephone) includes a shared pilot channel. The transmitted signal on this pilot channel generally is known, and the power is typically much higher than the traffic or information bearing channel. Thus, the pilot channel generally provides a reference signal for use in channel estimation.

When using the pilot channel for channel estimation, the resulting channel estimate is proportional to the square root of the power on the pilot channel. Ideally, the channel estimate should be proportional to the square root of the power on the traffic channel. When performing channel estimation on different signal echoes from the same base station, this proportional difference generally is not a problem, since all channel coefficients may differ by the same proportional amount.

SUMMARY OF THE INVENTION

The present invention includes digital receivers and receiving methods that scale for relative strengths of traffic and pilot channels during soft handoff. In particular, spread spectrum signals are processed from a plurality of traffic channels and a plurality of pilot channels by receiving data samples from a plurality of traffic channels and a plurality of pilot channels. Detection statistics are obtained from the received data samples that correspond to information symbols while accounting for the relative strengths of the plurality of traffic channels and the plurality of pilot channels. The detection statistics are preferably obtained by performing Rake combining while accounting for the relative strengths of the plurality of traffic channels and the plurality of pilot channels.

The invention stems from the realization that a mobile radiotelephone is often in soft or softer handoff, in which it receives transmissions from more than one transmitter. The different pilot and traffic channel powers generally are not the same for all base station transmissions. As a result, use of the pilot channel for channel estimation can become a problem. When channel estimates based on the different pilot channels are used to combine signal echoes together, these echoes may be combined with the wrong weighting.

For example, consider a radiotelephone that receives pilot and traffic channels from two base stations, A and B. Suppose the received power of the two pilot channels is the same, whereas the received traffic channel power from base station A is 10 times stronger than from base station B. Using the pilot channels for channel estimation, the two traffic signals would be combined such that, on average, the signals would be weighted equally. However, for optimum performance, the two signals should be weighted unequally, giving more weight to the stronger traffic signal from base station A.

The present invention can solve this problem by employing scale factors for each base station signal. These scale factors are included in the Rake receiver and can account for differences in the relative strengths between pilot and traffic channels.

More specifically, spread spectrum signals from a plurality of traffic channels and a plurality of pilot channels are processed by receiving data samples from the plurality of traffic channels and the plurality of pilot channels. The received data samples are correlated to spreading codes to produce pilot despread values and traffic despread values. Scale factors corresponding to the relative strengths of the plurality of traffic channels and the plurality of pilot channels are formed. A channel response is estimated using the pilot despread values to produce channel coefficient estimates. The traffic despread values are combined to obtain detection statistics that correspond to information symbols using the channel coefficient estimates. According to the invention, the traffic despread values, the channel estimates and/or the pilot despread values are scaled by the scale factors so as to obtain detection statistics that correspond to the relative strengths of the plurality of traffic channels and the plurality of pilot channels.

In a first embodiment, the traffic despread values are scaled by the scale factors so as to obtain scaled traffic despread values that are a function of the relative strengths of the plurality of traffic channels and the plurality of pilot channels. In a second embodiment, the channel coefficient estimates are scaled by the scale factors so as to obtain scaled channel coefficient estimates that are a function of the relative strengths of the plurality of traffic channels and the plurality of pilot channels. In a third embodiment, the pilot despread values are scaled by the scale factors so as to obtain scaled pilot despread values that are a function of the relative strengths of the plurality of traffic channels and the plurality of pilot channels.

The scale factors may be formed by estimating power on a pilot channel, estimating power on a traffic channel and determining scale factors based on the estimated powers on the pilot channel and the traffic channel. Alternatively, an error signal may be formed using the pilot channel despread values and the traffic channel despread values, and a scale factor may be computed based on the error signal. Moreover, scale factors may be formed using pilot despread values and traffic despread values corresponding to a plurality of delays of the transmitted signal. Finally, when estimating power on a traffic channel, an equivalent full rate power on the channel may be estimated that is independent of the reduced power that may be used with reduced data rates.

The present invention is preferably used during soft handoff from a first traffic channel to a second traffic channel. The first and second traffic channels may be provided by first and second base stations. Alternatively, the first and second traffic channels may be provided by two beam patterns or sectors from a single base station. Accurate channel estimation during handoff may therefore be provided, to thereby allow more accurate detection statistics.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For wireless communications, a transmitter emits electromagnetic waveforms from an antenna, the medium is the radio propagation environment, and a receiver employs one or more antennas to recover the transmitted signal. While the following embodiments are described in the context of radio communications, the invention is not limited to such systems and methods. It is also applicable to other digital communications environments including wire communications and magnetic storage systems. In such applications a radio processor may be generalized to a device that extracts data from the transmission or storage medium.

Figure 1:
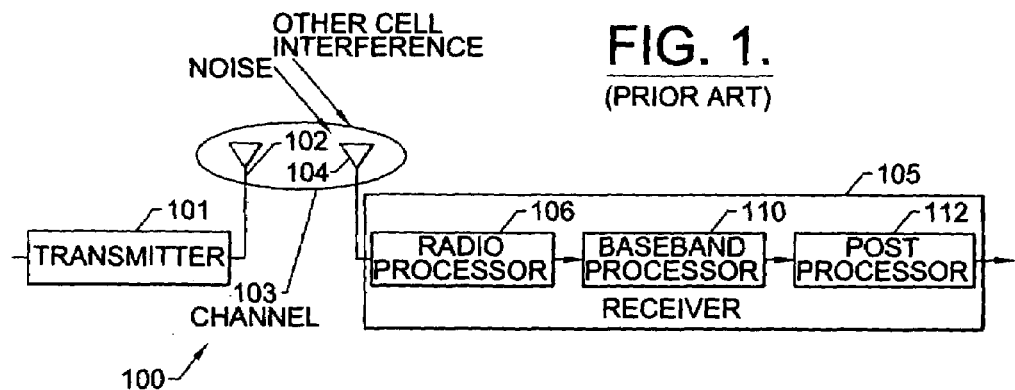
FIG. 1 is a block diagram of a conventional digital communications system.
Figure 2:
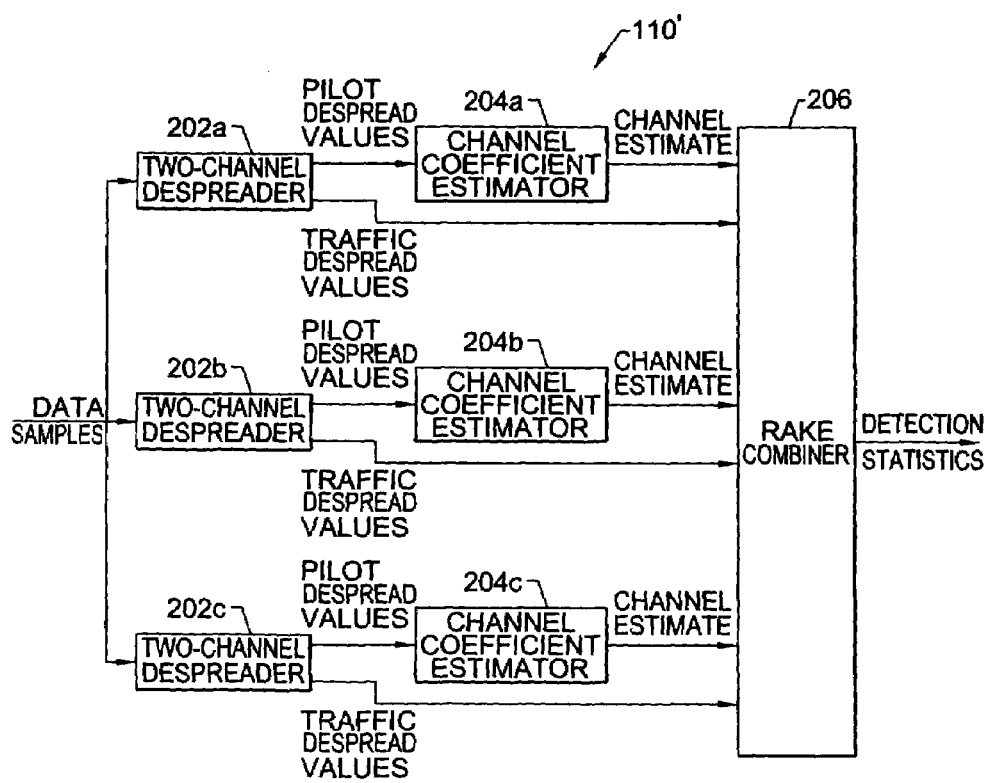
FIG. 2 is a block diagram of a baseband processor.

In co-pending application Ser. No. 08/748,755 to Bottomley et al., entitled "Despreading of Direct Sequence Spread Spectrum Communications Signals", the disclosure of which is hereby incorporated herein by reference in its entirety, an approach for Rake combining is described which includes channel estimation using a pilot channel. A baseband processor 110', according to this pending application is illustrated in FIG. 2. Baseband data samples are provided to a bank of two-channel despreader units 202a–202c, which correlate different delays of the received signal to the despreading codes of the pilot and traffic channels, producing pilot and traffic despread values. In FIG. 2, the different despreaders capture signal images from the same base station. The pilot despread values are provided to channel coefficient estimators 204a–204c, which can use conventional techniques to estimate complex channel coefficients. The traffic despread values and the channel coefficient estimates are provided to a Rake combiner 206, which combines the different traffic despread values using the channel estimates to produce detection statistics.

Figure 3:
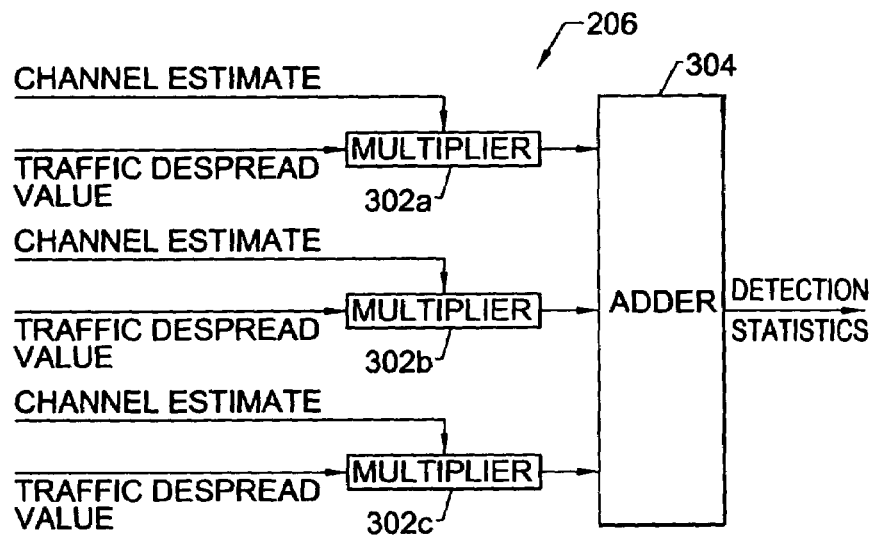
FIG. 3 is a block diagram of a Rake combiner.

The combining operation is a weighted sum, in which the weights are the conjugates of channel coefficient estimates. This is illustrated in FIG. 3. Channel estimates and traffic despread values are provided to multipliers 302a–302c, which produce products of traffic despread values with conjugates of channel estimates, i.e. channel coefficient estimates. If BPSK symbols are used, only the real part of this product is produced. Adder 304 sums the products together to produce the detection statistics.

Consider an example, in which the received chip-spaced baseband samples during one symbol period are represented by $r(k)$. The samples are modeled as $$r(k) = c_0[bKS_T(k) + S_P(k)]$$
$$+ c_1[bKS_T(k-1) + S_P(k-1)]$$
$$+ c_2[bKs_T(k-2) + s_P(k-2)] + w(k) \quad (1)$$

where b is the symbol sent, $c_j$ are the channel coefficients, the delays are 0, 1, and 2 chip periods, $S_T(k)$ is the traffic channel chip sequence used to spread the symbol, $S_P(k)$ is the pilot channel chip sequence, K is the relative amplitude between the traffic and pilot channels, and $w(k)$ is the impairment (noise+interference). Note that the delays correspond to delayed images of the transmitted signal.

The two-channel despreaders 202a–202c produce despread values for the pilot and traffic channels, denoted $x_P(j)$ and $x_T(j)$, where j indicates which despreader unit. The traffic despread values can be expressed as $$x_T(j) = \frac{1}{L}\sum_{k=0}^{L-1} S_T^*(k)r(k+j) \quad (2)$$

where the superscript "*" denotes complex conjugation and L is the despreading factor. Division of L is shown for illustrative purposes. In practice it is known how to extend results to the case when the division is omitted.

The Rake combiner 206 of FIG. 3 combines the despread values using estimates of the channel coefficients, denoted $c_j$, to produce a detection statistic that corresponds to an information symbol. This can be expressed as $$z = \hat{c}_0^* x_T(0) + \hat{c}_1^* x_T(1) + \hat{c}_2^* x_T(2) \quad (3)$$

The symbol value that is closest to z gives the detected value $\hat{b}$. For BPSK modulation, b is either +1 or −1, so that the detected value is given by the sign of the real part of z. The detection statistic can be used as a soft value, for further processing.

Now consider the case in which each despreader uses a despreading code corresponding to a different base station. This would be the case in a three-way soft handoff with base stations d, e, and f. For this case, the received samples during a particular symbol period can be modeled as $$r(k) = c_d[bK_d s_T^d(k) + s_P^d(k)] + \quad (4)$$
$$c_e[bK_e s_T^e(k) + s_P^e(k)] + c_f[bK_f s_T^f(k) + s_P^f(k)] + w(k)$$

where b is the symbol sent, $c_x$ are the channel coefficients corresponding to the different base stations, $S_T^x(k)$ is the traffic channel chip sequence used to spread the symbol on base station $S_P^x(k)$ is the pilot channel chip sequence corresponding to base station x, $K_x$ is the relative amplitude between the pilot and traffic channels for base station x, and $w(k)$ is the impairment (noise+interference).

Despreading is used to form despread values for the traffic channels for each base station signal, denoted $x_T^g$, where x indicates the base station signal and g is an index for the base stations. For optimal performance, the detection statistic z should be $$z = K_d \hat{c}_d^* x_T^d + K_e \hat{c}_e^* x_T^e + K_f \hat{c}_f^* x_T^f \quad (5)$$

As shown in Equation (5), scale factors $K_g$ are needed for optimal combining. However, if the approach described in FIGS. 2 and 3 is used, then the scale factors are not present, which can lead to suboptimal performance.

In the present invention, estimates of these scale factors are included. One approach is to estimate the scale factors and apply them to the traffic despread values prior to weighting by the channel estimates. Another approach scales the channel estimates first. A third approach applies the scale factors to the pilot despread values, so that they are implicitly included in the channel estimates. These approaches will be described in detail below.

Figure 4:
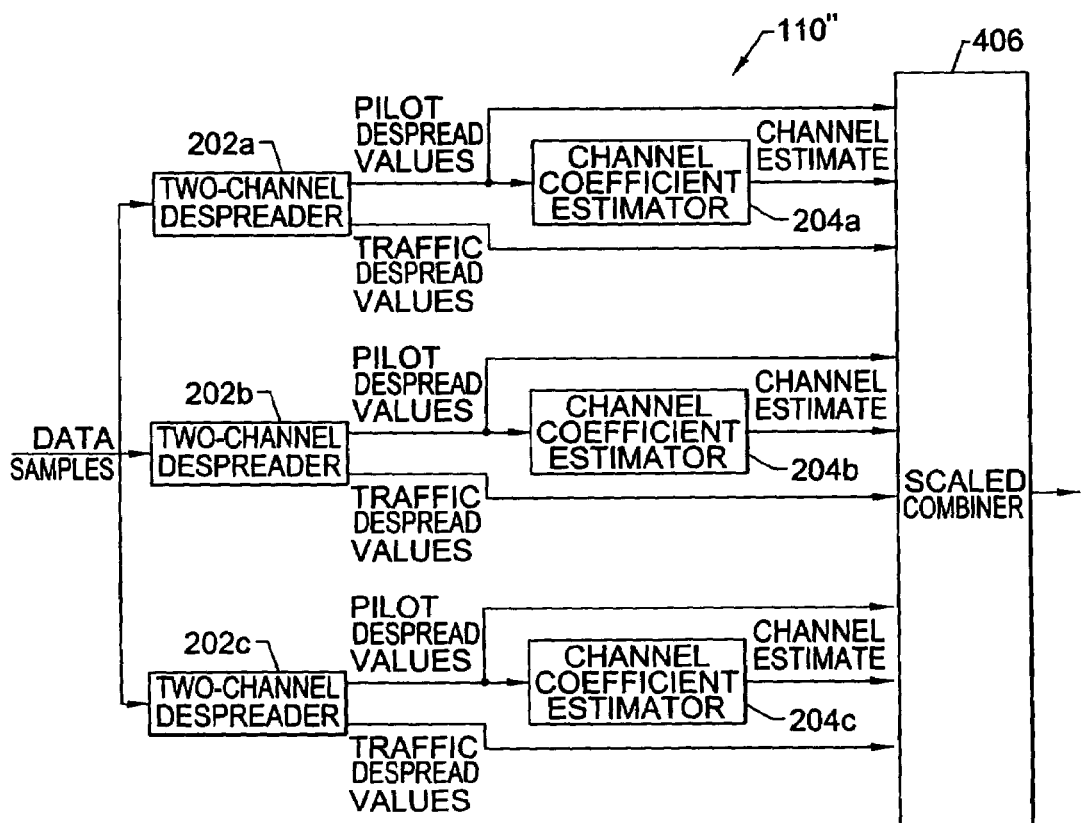
FIG. 4 is a block diagram of a baseband processor according to the present invention.

Baseband processor 110'', according to the present invention are shown in FIG. 4. Compared to FIG. 2, the pilot despread values are also provided to the combiner 406 and the combining is performed by a scaled combiner 406. It will be understood that, in general, the two-channel despreader 202a–202c can be replaced with any device that forms despread values for the pilot and traffic channels, such as two correlators.

Figure 5:
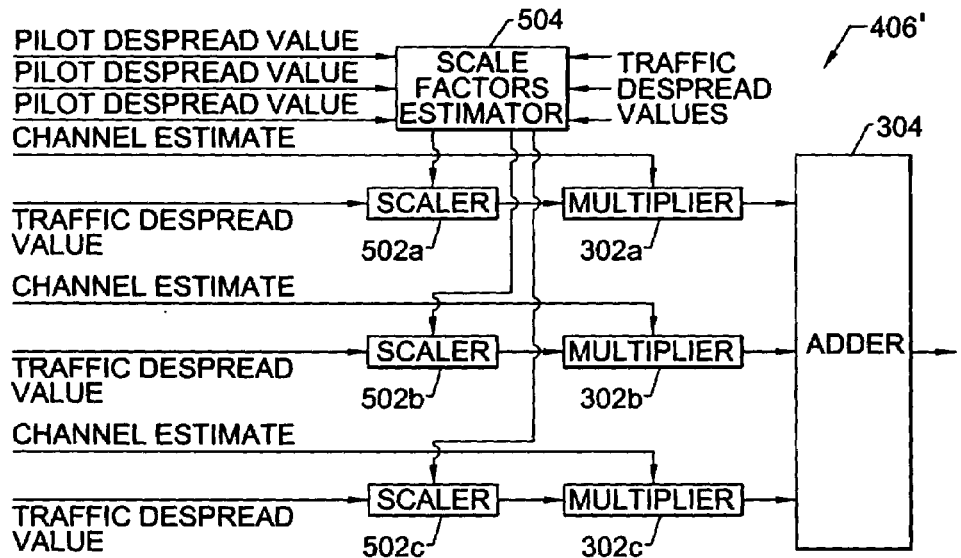
FIG. 5 is a block diagram of a scaled combiner according to the present invention.

An embodiment of the scaled combiner 406' is illustrated in FIG. 5. Compared to FIG. 3, the traffic despread values are scaled prior to combining. Scalers 502a–502c scale the complex traffic despread values by a real number multiplication. Scale factors are estimated in scale factors estimator 504, which uses pilot and traffic despread values to form scale factors. Multipliers 302a–302c are used to multiply the scaled traffic despread values and the channel estimates. An alternative can apply the scale factors to the channel estimates instead of the traffic despread values, prior to combining.

For BPSK modulation, multipliers 302a–302c only form the real part of the product. For this case, it is preferable to scale after the multiplier rather than before, so that only one real multiply may need to be performed during scaling.

Figure 6:
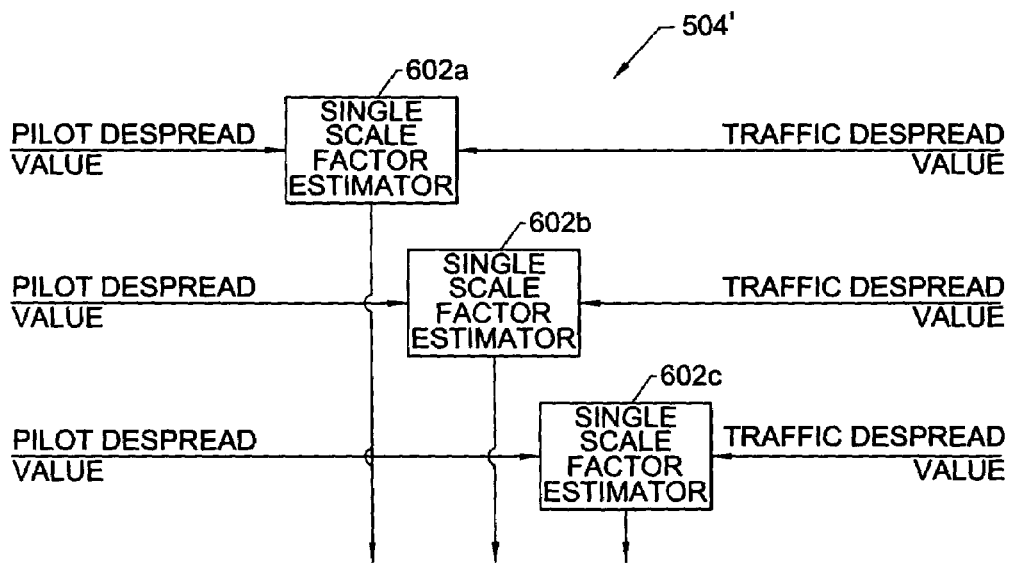
FIG. 6 is a block diagram of a scale factors estimator employing single scale factor estimators according the present invention.

An embodiment of the scale factors estimator 504' is illustrated in FIG. 6 for the case where each pair of pilot and traffic despread values corresponds to a different base station signal. The pilot and traffic despread values corresponding to the same base station are provided single scale factor estimators 602a–602c, which produce the scale factors.

Figure 7:
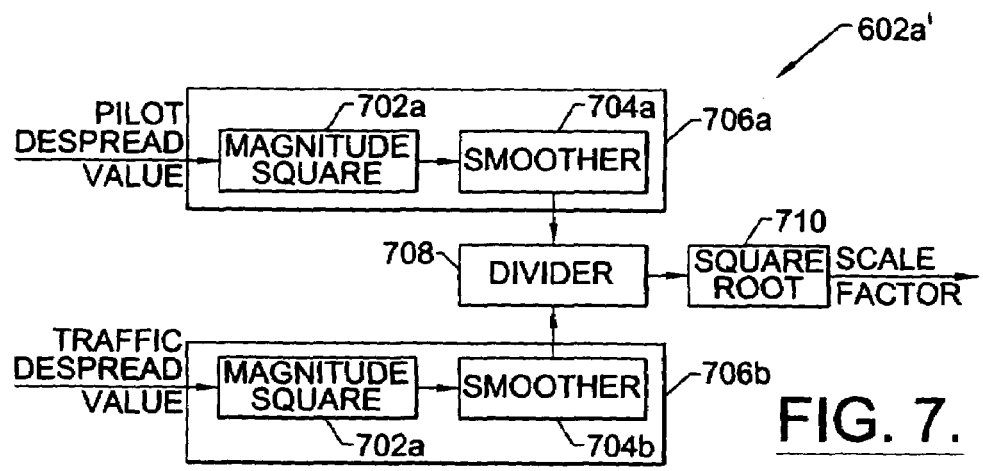
FIG. 7 is a block diagram of a feedforward single scale factor estimator according to the present invention.

An embodiment of a single scale factor estimator 602a' corresponding to a feedforward design is illustrated in FIG. 7. The pilot power is estimated in power estimator 706a using the pilot despread values. Specifically, the real and imaginary parts of the complex pilot despread values are squared and added together in magnitude square unit 702a. The resulting power estimate is smoothed in smoother 704a using, for example, exponential smoothing, to produce a smoothed pilot power estimate. Similar operations are applied to the traffic despread values by magnitude squared unit 702b and smoother 704b to produce a smoothed traffic power estimate. In divider 708, the smoothed traffic power estimate is divided by the smoothed pilot power estimate to produce a power ratio. The square root of this power ratio is determined by square root unit 710, producing a scale factor.

Figure 8:
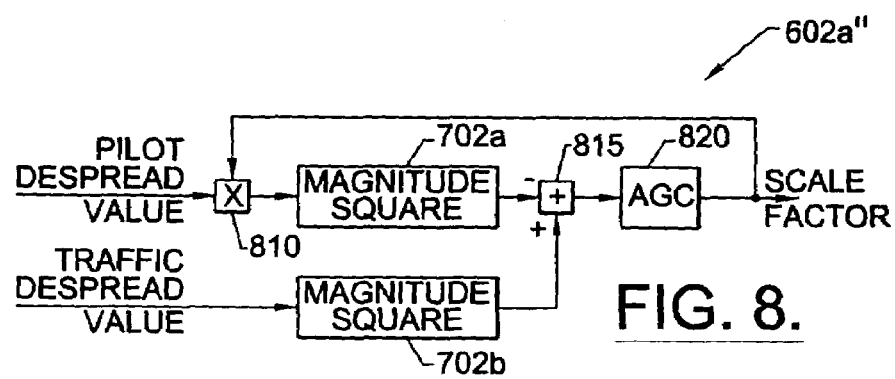
FIG. 8 is a block diagram of a feedback single scale factor estimator according to the present invention.

An alternative embodiment of a single scale factor estimator 602a" corresponding to a feedback design is illustrated in FIG. 8. The pilot despread value is scaled by the scale factor in multiplier 810. The scaled pilot despread value is magnitude squared in magnitude square unit 702a, producing a pilot magnitude square value. The traffic despread value is magnitude squared in magnitude square 702b, producing a traffic magnitude square value. The difference between the traffic magnitude square value and the pilot magnitude square value is determined by adder 815. This difference provides an error signal to a conventional Automatic Gain Control (AGC) unit 820, which adaptively determines a gain such that the size of the difference is minimized over time. This AGC gain is the scale factor, which can be initialized to one.

Thus, in FIG. 8, the scale factor is determined by a feedback control loop, which drives the scaled pilot despread values to have the same power as the traffic channel. The AGC circuit can, for example, filter the error signal and scale it by an AGC loop gain. The resulting signal is then accumulated and used as the gain or used to compute a gain.

Figure 9:
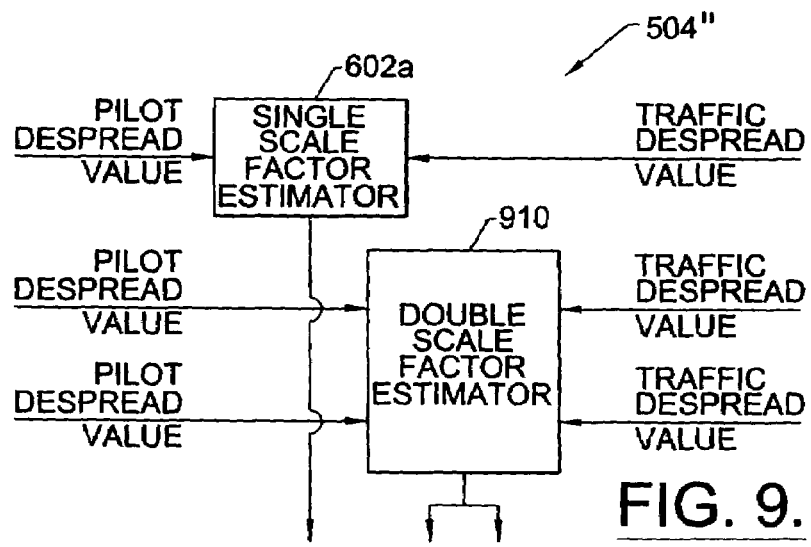
FIG. 9 is a block diagram of a scale factors estimator employing both single and double scale factor estimators according to the present invention.

Another embodiment of a scale factors estimator 504" is illustrated in FIG. 9 for the case where one pair of pilot and traffic despread values corresponds to one base station signal and the other two pairs of pilot and traffic despread values correspond to a second base station. The despread values corresponding to the second base station are provided to double scale factor estimator 910, which produces a common scale factor.

Figure 10:
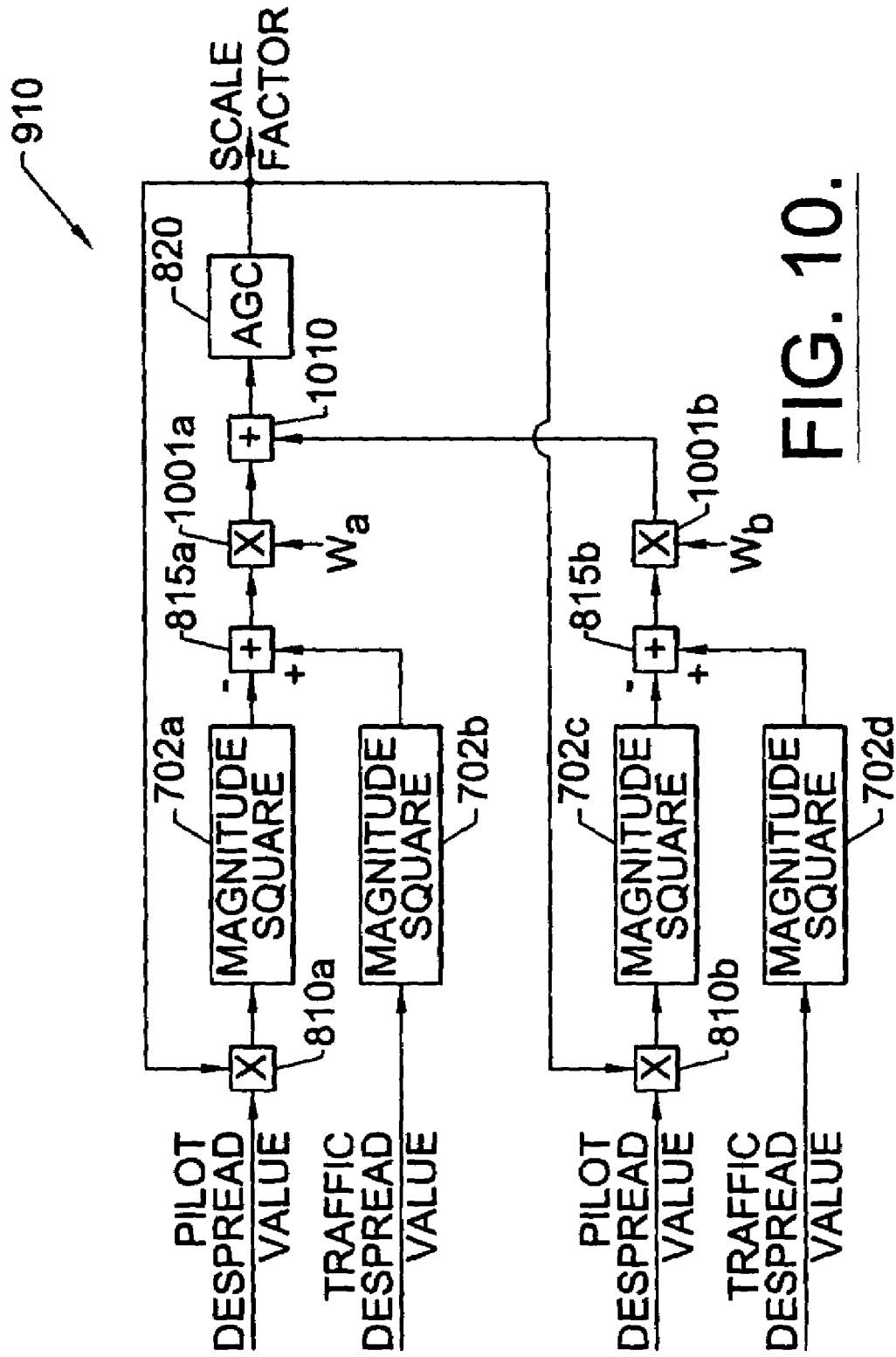
FIG. 10 is a block diagram of a feedback double scale factor estimator according to the present invention.

An embodiment of a double scale factor estimator 910 is illustrated in FIG. 10 and corresponds to a feedback design. The embodiment of FIG. 10 is similar to FIG. 8, except that the error signal provided to AGC unit 820 is a weighted combination of error signals provided by processing of the different pairs of pilot and traffic despread values. The differences produced by adders 815a and 815b are multiplied in multipliers 1001a–1001b by weights, $w_a$ and $w_b$, respectively. These weights can be dependent on the strengths of the rays, giving more weight to a stronger ray. Ray strength can be determined by channel estimates. Also, the multipliers 1001a–1001b may be omitted, giving equal weight to both differences.

It also will be understood to one of skill in the art that a double scale factor estimator corresponding to the feedforward design can be implemented. Pilot power estimates from multiple delays can be combined prior to the divider, as well as multiple traffic power estimates. There can be one divider per delay, followed by an averaging device prior to the square root. Other configurations may be provided.

Figure 11:
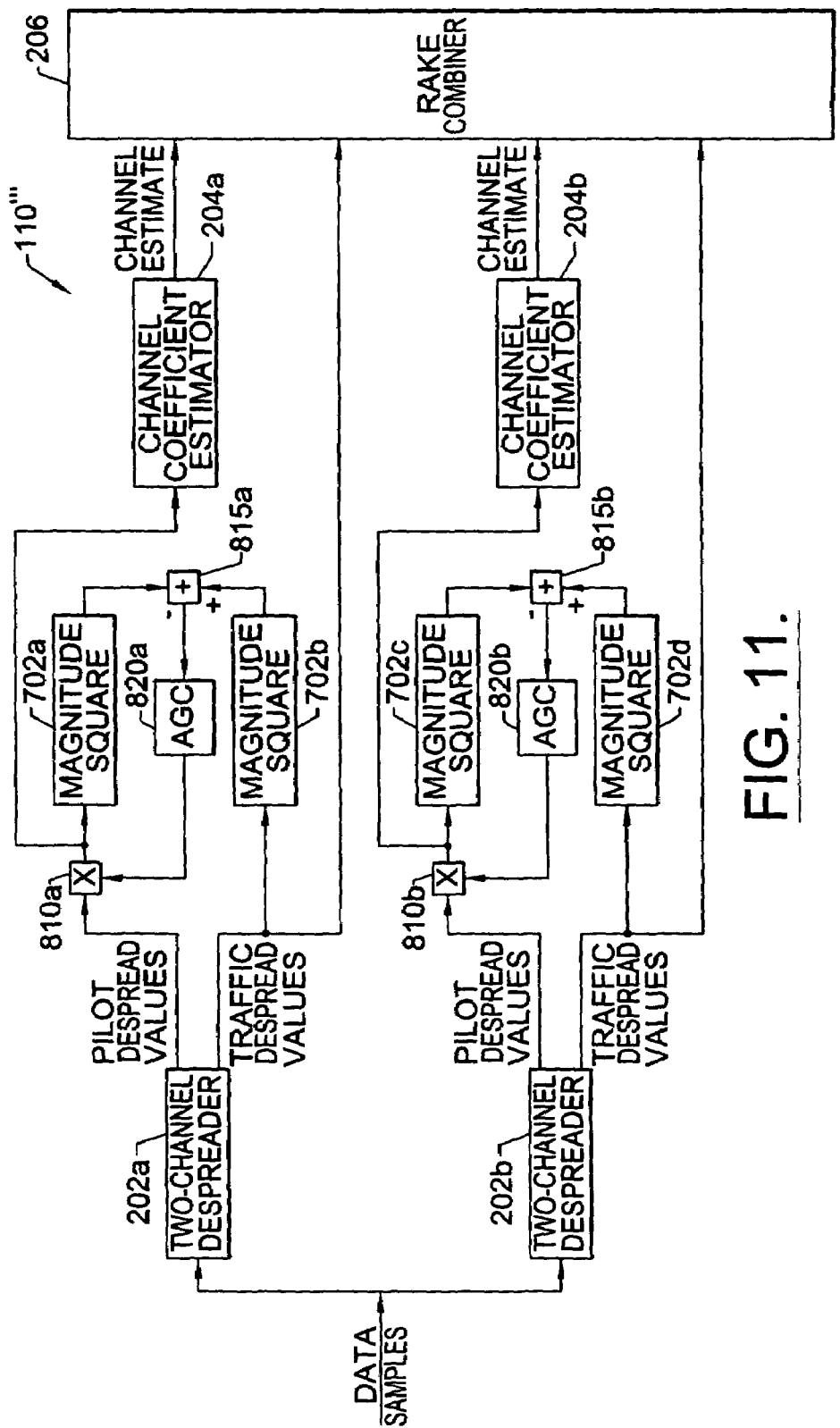
FIG. 11 is a block diagram of a second embodiment of a baseband processor according to the present invention.

A second embodiment of a baseband processor 110''' according to the present invention is illustrated in FIG. 11. In this embodiment, feedback AGC is used to scale the pilot despread values prior to channel estimation. As a result, a conventional Rake combiner 206 can be used.

The present invention can also exploit side information regarding the relative strengths of the pilot and traffic channels from a particular base station. For example, the receiver may be given information from the base station regarding the relative strengths. Conventional control techniques also may allow computation of the relative strengths. Also, once the relative strengths are known, changes in the relative strengths may be a function of known power control commands. It will also be understood that the power on a traffic channel may be estimated using an equivalent full rate power on the traffic channel. Specifically, it is known to vary the power level of a signal as a function of the data rate to maintain the energy per bit relatively constant. Accordingly, data rate information may be included when estimating the power on a traffic channel.

For example, the traffic correlations can be scaled to corresponding full-rate levels using detected rate information. For Rate set 1 in IS-95, there are four data rates: 9600 bps, 4800 bps, 2400 bps, and 1200 bps. These are transmitted at relative power levels of 1, ½, ¼, ⅛, respectively. Thus, traffic correlations can be scaled using scale factors 1, $\sqrt{2}$, 2 and $\sqrt{8}$ depending on the detected rate. Certain frames can be skipped if the rate cannot be determined, the CRC or some error detection scheme indicates errors, and/or the rate is not known with enough confidence. Alternatively, correlations can be scaled to correspond to any of the four rates or some arbitrary level. For example, scale factors $\sqrt{1/8}$, ½, $1/\sqrt{2}$ and 1 can be used for rates 9600, 4800, 2400 and 1200 bps to normalize with respect to the lowest rate.

It may also be desirable to normalize the scale factors by the largest or some nominal base station. Then, for correlations from one base station, no scaling may be necessary.

The despreading operation is based on delay estimates for the different signal echoes or images. Any conventional delay estimation approach may be used. It can employ the approaches disclosed in pending U.S. application Ser. No. 09/005,580 to Sourour et al., entitled "Method and Apparatus for Multipath Delay Estimation in Direct Sequence Spread Spectrum Communication Systems", filed Jan. 12, 1998, the disclosure of which is hereby incorporated herein by reference.

The present invention can use any type of channel coefficient estimation/tracking algorithm. For example, the LMS, KLMS, RLS, and Kalman tracking algorithms may be used. While chip-spaced rays were used as examples, the rays can have arbitrary spacing, including fractional spacing. Channel coefficient estimation can also be performed using interpolation between pilot symbol sections. Pulse shaping side information also may be used to improve coefficient estimation. Similarly, the present invention can use many approaches to scale factor estimation. The scale factors can be either tracked or interpolated between pilot symbol sections.

The present invention also can be used in a multi-pass approach. Despread values corresponding to a data frame can be stored. In the post-processing phase, forward-error-correction and forward-error-detection decoding can be used to correct or detect errors. Then, re-encoding can be used to provide reference symbols for a second-pass, for better parameter estimation. Multi-pass demodulation is described in U.S. Pat. No. 5,673,291 to Dent entitled "Simultaneous Demodulation and Decoding of a Digitally Modulated Radio Signal Using Known Symbols", the disclosure of which is hereby incorporated herein by reference. The present invention can also be used in conjunction with enhanced Rake combining approaches.

The present invention can be used with multiple receive antennas. Scale factors then may only be a function of base station, being the same for different antennas. Thus, when estimating the scale factors, data from different antennas can be used in an analogous way to using data from different rays or delays. The present invention can also be used in conjunction with the multiple receive antenna combining techniques described in U.S. application Ser. No. 08/992,174 to Karlsson et al., entitled "Mobile Station Having Plural Antenna Elements and Interference Suppression", filed Dec. 17, 1997, the disclosure of which is hereby incorporated herein by reference.

The invention has been described in the context of a pilot channel as the reference. It will be understood that pilot channels include systems with pilot symbols, wherein the pilot symbol power may differ from the traffic channel power.

Those skilled in the art will appreciate that the present invention is not limited to the specific embodiments which have been described herein for the purposes of illustration. The scope of the invention, therefore, is defined by the claims which are appended hereto, rather than the foregoing description, and all equivalents which are consistent with the meaning of the claims are intended to be embraced herein.

What is claimed is:

1. A method of processing spread spectrum signals from a plurality of traffic channels and a plurality of pilot channels, comprising the steps of:
   receiving data samples from the plurality of traffic channels and the plurality of pilot channels;
   correlating the received data samples to spreading codes to produce pilot despread values and traffic despread values;
   forming scale factors corresponding to the relative strengths of the plurality of traffic channels and the plurality of pilot channels;
   scaling the pilot despread values by the scale factors to form scaled pilot despread values;
   estimating channel responses using the scaled pilot despread values to produce channel coefficient estimates;
   combining the traffic despread values, using the channel coefficient estimates, to obtain detection statistics that correspond to the relative strengths of the plurality of traffic channels and the plurality of pilot channels;
   wherein the step of forming scale factors comprises the steps of:
   forming an error signal using the pilot channel despread values and the traffic channel despread values; and
   computing a scale factor based on the error signal.

2. A system for processing spread spectrum signals from a plurality of traffic channels and a plurality of pilot channels, the system comprising:
   a receiver that receives data samples from the plurality of traffic channels and the plurality of pilot channels;
   a correlator that correlates the received data samples to spreading codes to produce pilot despread values and traffic despread values;
   a scale factor estimator that estimates scale factors corresponding to the relative strengths of the plurality of traffic channels and the plurality of pilot channels;
   a scaler that scales the pilot despread values by the scale factors to form scaled pilot despread values;
   a channel coefficient estimator that estimates channel responses using the scaled pilot despread values to produce channel coefficient estimates;
   a combiner that combines the traffic despread values, using the channel coefficient estimates, to obtain detection statistics that correspond to the relative strengths of the plurality of traffic channels and the plurality of pilot channels; and
   an error signal generator that is responsive to the pilot channel despread values and the traffic channel despread values.

3. A method of processing spread spectrum signals from a plurality of traffic channels and a plurality of pilot channels, comprising the steps of:
   receiving data samples from the plurality of traffic channels and the plurality of pilot channels;
   correlating the received data samples to spreading codes to produce pilot despread values and traffic despread values;
   forming scale factors corresponding to the relative strengths of the plurality of traffic channels and the plurality of pilot channels;
   scaling the pilot despread values by the scale factors to form scaled pilot despread values;
   estimating channel responses using the scaled pilot despread values to produce channel coefficient estimates;
   combining the traffic despread values, using the channel coefficient estimates, to obtain detection statistics that correspond to the relative strengths of the plurality of traffic channels and the plurality of pilot channels;
   wherein the step of forming scale factors comprises the steps of:
   estimating power on a pilot channel;
   estimating power on a traffic channel;
   dividing the estimated power on the traffic channel by the estimated power on the pilot channel to produce a power ratio; and
   obtaining a square root of the power ratio to produce the scale factor.

4. A method according to claim 3 wherein the step of estimating power on a traffic channel comprises the step of estimating an equivalent full rate power on the traffic channel.

5. A system for processing spread spectrum signals from a plurality of traffic channels and a plurality of pilot channels, the system comprising:
   means for receiving data samples from the plurality of traffic channels and the plurality of pilot channels;
   means for correlating the received data samples to spreading codes to produce pilot despread values and traffic despread values;

means for forming scale factors corresponding to the relative strengths of the plurality of traffic channels and the plurality of pilot channels;

means for scaling the pilot despread values by the scale factors to form scaled pilot despread values;

means for estimating channel responses using the scaled pilot despread values to produce channel coefficient estimates;

means for combining the traffic despread values, using the channel coefficient estimates, to obtain detection statistics that correspond to the relative strengths of the plurality of traffic channels and the plurality of pilot channels;

wherein the means for forming scale factors comprises:
means for estimating power on a pilot channel;
means for estimating power on a traffic channel;
means for dividing the estimated power on the traffic channel by the estimated power on the pilot channel to produce a power ratio; and
means for obtaining a square root of the power ratio to produce the scale factor.

6. A system according to claim 5 wherein the means for estimating power on a traffic channel comprises means for estimating an equivalent full rate power on the traffic channel.

7. A system for processing spread spectrum signals from a plurality of traffic channels and a plurality of pilot channels, the system comprising:

a receiver that receives data samples from the plurality of traffic channels and the plurality of pilot channels;

a correlator that correlates the received data samples to spreading codes to produce pilot despread values and traffic despread values;

a scale factor estimator that estimates scale factors corresponding to the relative strengths of the plurality of traffic channels and the plurality of pilot channels;

a scaler that scales the pilot despread values by the scale factors to form scaled pilot despread values;

a channel coefficient estimator that estimates channel responses using the scaled pilot despread values to produce channel coefficient estimates;

a combiner that combines the traffic despread values, using the channel coefficient estimates, to obtain detection statistics that correspond to the relative strengths of the plurality of traffic channels and the plurality of pilot channels;

wherein the scale factor estimator comprises:
a pilot channel power estimator;
a traffic channel power estimator;
a divider that is responsive to the pilot channel power estimator and to the traffic channel power estimator; and
a square root calculator that is responsive to the divider.

8. A system according to claim 7 wherein the traffic channel power estimator comprises an equivalent full rate power traffic channel estimator.

* * * * *